United States Patent
Marek et al.

(10) Patent No.: US 9,537,647 B2
(45) Date of Patent: Jan. 3, 2017

(54) METHOD AND DEVICE FOR PROCESSING UHF SIGNALS FOR AN EPC COMMUNICATION

(71) Applicant: EM Microelectronic-Marin SA, Marin (CH)

(72) Inventors: Tomas Marek, Sulice-Hlubocinka (CZ); Tomas Hrdy, Rudna U Prahy (CZ); Lubos Hradecky, Kolodeje (CZ)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 15/053,571

(22) Filed: Feb. 25, 2016

(65) Prior Publication Data

US 2016/0301516 A1 Oct. 13, 2016

(30) Foreign Application Priority Data

Apr. 9, 2015 (EP) .................................... 15163057

(51) Int. Cl.
*H04B 7/00* (2006.01)
*H04L 7/00* (2006.01)
*H04L 7/04* (2006.01)
*H04B 5/00* (2006.01)

(52) U.S. Cl.
CPC ........... *H04L 7/0004* (2013.01); *H04B 5/0062* (2013.01); *H04L 7/042* (2013.01)

(58) Field of Classification Search
CPC ....... H04L 7/0004; H04L 7/042; H04B 5/0062
See application file for complete search history.

(56) References Cited

U.S. PATENT DOCUMENTS

| | | | |
|---|---|---|---|
| 2007/0126584 A1* | 6/2007 | Hyde ................... | H04B 5/0062 340/572.4 |
| 2010/0099355 A1* | 4/2010 | Rofougaran ........... | H04B 1/525 455/41.1 |
| 2011/0142174 A1* | 6/2011 | Park ..................... | H04B 1/7183 375/340 |

OTHER PUBLICATIONS

European Search Report issued Sep. 16, 2015 in European application 15163057.1, filed on Apr. 9, 2015.
Weiwei Shi et al. "A Process-Compatible Passive RFID Tag's Digital Design for Subthreshold Operation", Electronics, Circuits and Systems (ICECS), 2012 19th IEEE International Conference on, IEEE, Dec. 9, 2012, 4 pages.

(Continued)

*Primary Examiner* — Dac Ha
(74) *Attorney, Agent, or Firm* — Oblon, McClelland, Maier & Neustadt, L.L.P.

(57) ABSTRACT

The invention concerns a method and device for processing UHF signals for an EPC communication. The method includes the steps of picking up UHF signals by an antenna of the device for processing UHF signals, creating an envelope signal from the UHF signals picked by the antenna in a demodulator, processing the envelope signal and decoding critical TRcal symbol and data in a logic unit of the device. Furthermore, the method includes the steps of interpreting the critical TRcal symbol and data, storing the interpreted data, encoding transmit data, modulating by encoded data in a modulator, and clocking the steps as above by a local oscillator. In the step of processing the envelope signal, the critical TRcal symbol is processed by a high frequency clock and data are processed by a low frequency clock.

12 Claims, 2 Drawing Sheets

(56) References Cited

OTHER PUBLICATIONS

Qiasi Luo et al. "A Low-Power Dual-Clock Strategy for Digital Circuits of EPC Gen2 RFID tag", 2009 IEEE International Conference on RFID, Apr. 27, 2009, 8 pages.

Zheng Wang et al. "Design of a Passive UHF RFID Transponder Featuring a Variation-Tolerant Baseband Processor", 2010 IEEE International Conference on, IEEE, Apr. 4, 2010, 8 pages.

* cited by examiner

METHOD AND DEVICE FOR PROCESSING UHF SIGNALS FOR AN EPC COMMUNICATION

This application claims priority from European Patent Application No. 15163057.1 filed Apr. 9, 2015, the entire disclosure of which is hereby incorporated herein by reference.

TECHNICAL FIELD

The invention relates to a method and a device for processing UHF signals for an EPC communication. Particularly the method and the device can be able to process differently at least measurements of critical TRcal symbol and data coded by a pulse interval coding.

BACKGROUND OF THE INVENTION

The EPC Class-1 Generation-2 UHF RFID standard is widely accepted UHF standard. This protocol defines interrogator-talks-first RFID system. The interrogator commands are encoded by PIE (pulse interval encoding). Command replies are backscattered at BLF (backscatter-link frequency). The BLF is determined by length of a TRcal symbol which is part of the defined Query command.

The length of the TRcal symbol must be measured precisely to full-fill BLF tolerances given by the EPC standard. The length of the symbol can be measured by using a timer counting number of internal oscillator clock cycles between start and end of the TRcal symbol, the start/end of the symbol is determined from re-sampled demodulator output. It can be used also clock-less methods based for example on capacitor charging such as described in the article of Sung-Jin Kim; Min-Chang Cho; Joonhyun Park; Kisuk Song; Yul Kim; SeongHwan Cho entitled "An ultra-low power UHF RFID tag front-end for EPCglobal Gen2 with novel clock-free decoder" of Circuits and Systems, 2008. ISCAS 2008. IEEE International Symposium on, vol., no., pp. 660, 663, 18-21 May 2008.

The clock-less methods are not widely used because they are not so robust and easy to implement as timer based method.

For timer based method, the precision of length measurement is related to internal oscillator clock frequency—the higher the frequency, the smaller re-sampling error, the better symbol start/end detection, the more precise measurement. On the other hand, the higher the frequency, the higher power consumption. Several studies were done to determine minimum internal oscillator clock frequency which fulfils EPC Class-1 Generation-2 BLF requirements. One can cite for that the article in Impinj Inc., entitled "Gen 2 Tag Clock Rate—What You Need to Know" 2005, or the article of Qiasi Luo; Li Guo; Qing Li; Gang Zhang; Junyu Wang, entitled "A low-power dual-clock strategy for digital circuits of EPC Gen2 RFID tag" RFID, 2009 IEEE International Conference on, vol., no., pp. 7, 14, 27-28 April 2009.

In summary, two options are used. First option, it is used the timer based method, which uses an oscillator with frequency 1.92 MHz or higher (the multiples of highest defined BLF 640 kHz). Second option, it is used an alternative dynamically calibrated methods as defined in the patent application US 2011/0156871 A1, and the patent U.S. Pat. No. 8,193,912 B1.

Again, the alternative dynamically calibrated methods are not so robust and easy to implement as timer based method.

A power optimization of timer based method was proposed in the article of Qiasi Luo; Li Guo; Qing Li; Gang Zhang; Junyu Wang, entitled "A low-power dual-clock strategy for digital circuits of EPC Gen2 RFID tag" RFID, 2009 IEEE International Conference on, vol., no., pp. 7, 14, 27-28 April 2009.

SUMMARY OF THE INVENTION

The object of the invention is to provide a method of an above-mentioned type that has lower power consumption than known methods and still is robust and easy to implement. Another object of the invention is to provide a device to carry out this method into effect.

These objects are achieved by the method and the device according to the invention with features as defined in the independent patent claims 1 and 5, respectively.

Advantageous embodiments of the inventions are disclosed in the dependent patent claims.

The proposed new solution has the advantage that basically it is proposed to use a different clock frequency for decoding of TRcal symbol and for the rest of the received symbols. This is a difference with respect to the timer based state-of-the-art methods, which use the single high frequency (2.56 MHz) EPC decoder.

The invention is the dual frequency EPC Gen2 Decoder with low power consumption. High frequency (2.56 MHz or 1.92 MHz) is used for measurement of critical TRcal symbol when high precision is required and low frequency (1.28 MHz) is used for decoding of other symbols when power optimization is preferred.

BRIEF DESCRIPTION OF THE DRAWINGS

The present invention will be apparent more clearly to those skilled in the art by reading the following description with reference to the attached drawings. In the drawings.

DETAILED DESCRIPTION OF EMBODIMENTS OF THE INVENTION

Figure 1:
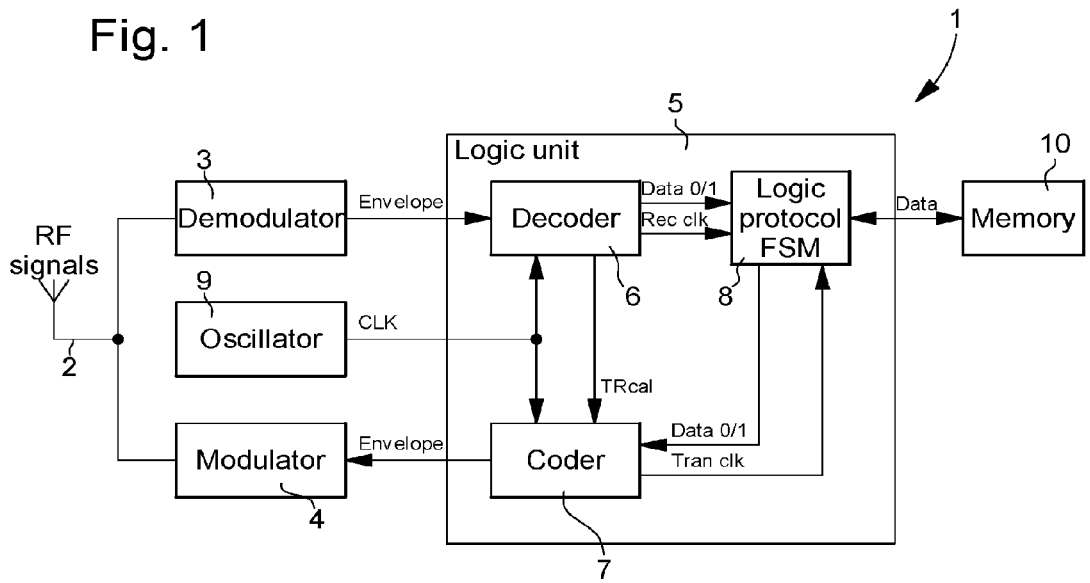
FIG. 1 illustrates schematically the architecture of general UHF transponder.

FIG. 1 shows an architecture of a general UHF transponder 1 (TAG) or generally a device 1 for processing RF signals with symbols or data. This device or transponder is configured for a communication according to an EPC protocol by UHF signals with an interrogator or reader. A reader can communicate with the transponder 1 by modulating an RF carrier in RF signals.

First of all, the transponder 1 can pick up the RF or UHF signals by an antenna 2, which is connected to a demodulator 3 and a modulator 4. The demodulator 3 receives at input the modulated RF carrier signals and provides at output an envelope signal. The envelope signal is than decoded and translated to data in a decoder 6, which is a part of a logic unit 5. The decoded data are then interpreted as commands and processed by a logic protocol FSM unit 8 in the logic unit 5. For that the decoder transmits data 0/1 and a clocking signal Rec_clk based on the clocking of the decoder for the signal reception.

The transponder replay is generated in similar manner, wherein the data generated in the logic protocol FSM unit 8 are translated to kind of modulation envelope signal by a coder 7 of the logic unit 5. For that the coder 7 receives command from the decoder 6 by a signal TRcal and data 0/1 from the logic protocol FSM unit 8. The coder 7 transmits also a signal Tran_clk based on the clocking of the coder for the signal transmission to the logic protocol FSM unit 8. The reflection coefficient of transponder antenna 2 is switched in the modulator 4, according to the modulation envelope signal.

It is to be noted that the logic protocol FSM unit 8 can be clocked directly from the oscillator 9 or across the decoder 6 and the coder 7.

The transponder 1 or device further includes a local oscillator 9 for providing a clock signal CLK to the decoder 6 and the coder 7, and a memory 10, which can be a non-volatile memory in particular for storing the interpreted data. Some data can be also taken by the logic protocol FSM unit 8 to be transmitted by the transponder in the RF signals.

It is to be noted that the invention is mainly focused on the decoder block or unit 6.

Figure 2:
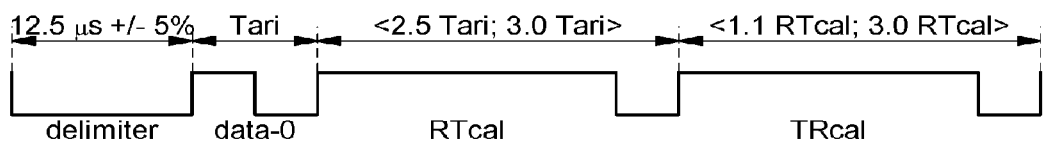
FIG. 2 illustrates an EPC Gen 2 command preamble.

The EPC Gen 2 command preamble is illustrated in FIG. 2. The preamble consists of Delimiter, Data-0, Reader to Tag calibration (RTcal), and Tag to Reader calibration (TRcal) symbols. The RTcal symbol length defines length of data symbols transmitted by interrogator or reader. For that the data symbols shorter than RTcal/2 are considered zeros. The TRcal symbol defines tag backscatter link frequency (BLF) used during transponder reply backscattering. As described in the article of Impinj Inc. of 2005 and entitled "Gen 2 Tag Clock Rate—What You Need to Know" and the article of Qiasi Luo, Li Guo, Qing Li, Gang Zhang and Junyu Wang of 2009 and entitled "A low-power dual-clock strategy for digital circuits of EPC Gen2 RFID tag" mentioned above, the frequency of 1.92 MHz or higher has to be used for TRcal measurement, otherwise the used tag BLF would not meet the EPC standard requirements.

Figure 3:
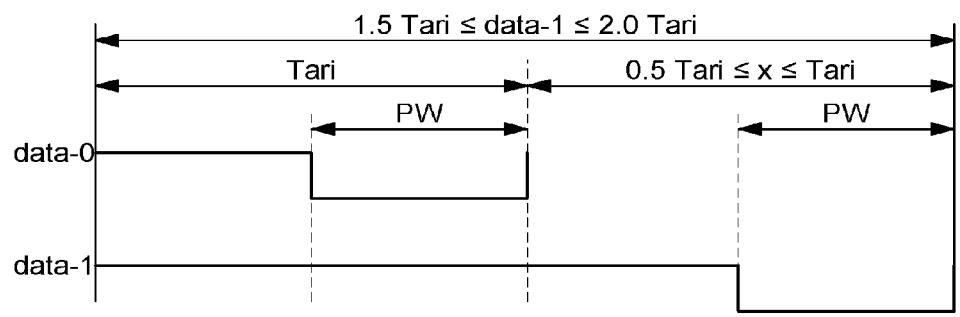
FIG. 3 illustrates the PIE data symbols.

However, the shortest EPC Gen2 PIE data symbol is defined as 6.25 µs-1%. The minimum difference between zero and one symbol is defined as 0.5·6.25 µs-1%=3.125 ps-1%. The minimum pulse width PW is defined as 2 µs. One can see the definition of PIE data symbols as shown in FIG. 3 for further details.

Therefore, the frequency of 1 MHz or higher should be sufficient for correct data symbols decoding according to Nyquist-Shannon-Kotelnikov sampling theorem.

Figure 4:
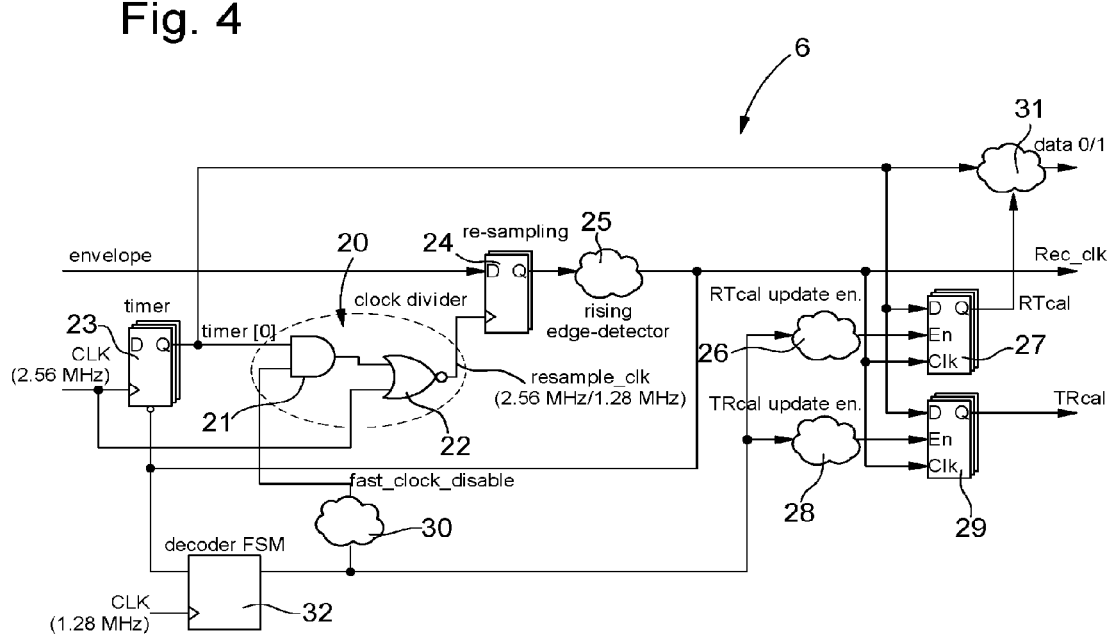
FIG. 4 shows the principle for 2.56 MHz input clock frequency for the decoder unit.

The principle for 2.56 MHz input clock frequency is illustrated in FIG. 4. In more details, the proposed EPC Gen2 decoder 6 is composed of a timer 23, an asynchronous envelope re-sampling circuit 24, a data 0/1 generator 31, a RTcal register 27, a TRcal register 29, and a decoder FSM 32. After the asynchronous envelope re-sampling circuit 24, it can be provided a rising edge-rising detector 25 for supplying the signal Rec_clk based on the clocking of the decoder for the signal reception.

The envelope signal from the demodulator is sampled by the re-sampling circuit 24. The clock frequency of this re-sampling circuit 24 is dynamically changed based on the decoder FSM state with dec_state equal to TRcal 30 by the signal fast_clock_disable and across a clock divider 20. If the decoder FSM state is equal to TRcal, then the high frequency, not divided by the clock divider, is used for TRcal symbol length measurement, whereas the low divided frequency is used for other symbol length measurement, i.e. decoding of other symbols or data.

The length of the received symbols is measured by the timer circuit 23, which is implemented as ripple counter and rising edge detector circuit 25. The rising edge detector circuit 25 detects the re-sampled envelope rising edge, ie. the border between two consecutive symbols. If the rising edge is detected then the timer value representing the length of a measured symbol is then stored in a RTcal register 27, if the decoder FSM state dec_state is equal to RTcal 26, or stored in a TRcal register 29, if the decoder FSM state dec_state is equal to TRcal 28. The timer value representing the length of a measured symbol can also be compared with RTcal/2 value in the data 0/1 generator 31 to decode PIE encoded data 0/1. The stored RTcal value is then used to decode data, the stored TRcal value at output of the TRcal register 29 is used to determine BLF during tag reply back-scattering.

The high frequency clock signal CLK generated by the local oscillator is divided by clock divider circuit 20, using clock gating technique 21, 22. Clock gating enable is based on the state of the timer 23 and decoder FSM 32 state. The clock gating filters out each odd pulse if the decoder FSM 32 state dec_state is not equal to TRcal 30. So the low frequency of 1.28 MHz is generated in this case. The same clock gating can be used also to disable re-sampling clock signal in case the decoder is completely disabled.

The clock gating in the clock divider 20 can be composed of an AND gate 21 followed by a NOR gate 22. The AND gate 21 receives the output of the timer first stage 23 at a first input, and a signal defined fast_clock_disable of a decoder state through the unit 30 connected to the output of the decoder FSM 32, which is clocked by the low frequency clock signal at 1.28 MHz. The signal fast_clock_disable is equal to logic 0 if the decoder FSM 32 state is equal to TRcal and equal to logic 1 otherwise. The output of the AND gate 21 is connected to a first input of the NOR gate 22 of the clock divider 20. The second input of the NOR gate 22 receives the high frequency clock signal CLK (2.56 MHz). The output of the NOR gate 22 supplied a clock signal "resample_clk" for the re-sampling circuit 24, whose the frequency depends on the state of the decoder FSM 32.

Figure 5:
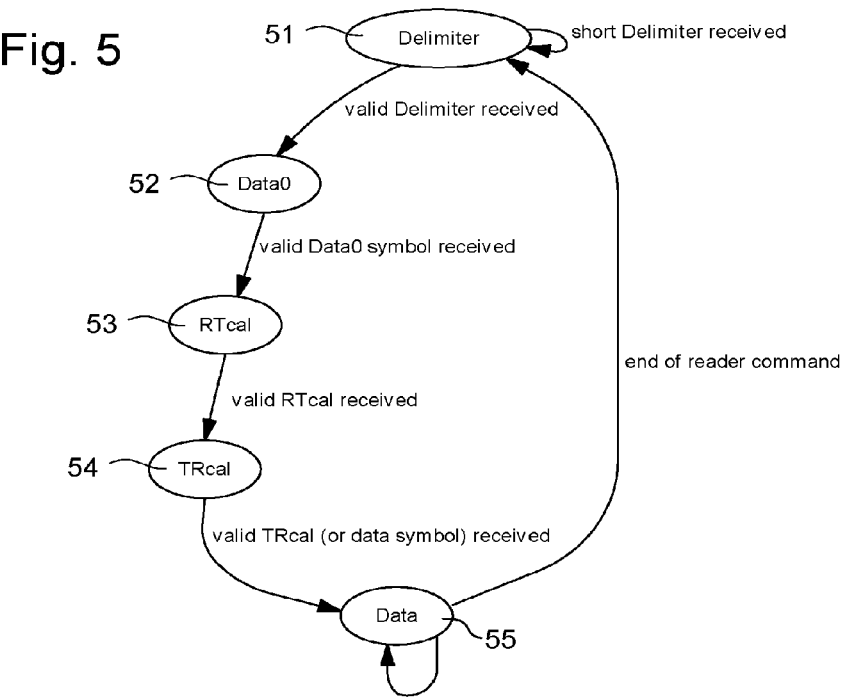
FIG. 5 illustrates schematically the functional principle of the decoder FSM shown in FIG. 4.

The functional schema for operation of the decoder FSM 32 is clearly illustrated in FIG. 5. The first symbol expected by decoder FSM is the Delimiter at step 51. Once the delimiter is decoded then the next incoming symbols (Data0, RTcal, TRcal) are successively processed at steps 52, 53, 54, followed by Data symbols processing at step 55. When all the received symbols of reader command are processed/decoded, then the FSM is ready to process the 1$^{st}$ symbol (Delimiter) of next reader command.

The present invention is not limited to the above described embodiments. Various alternatives, modifications and equivalents may be used. Therefore, the description above is not to be taken as limiting the scope of the present invention, which is defined by the attached claims.

What is claimed is:

1. A method for processing differently measurements of critical Tag to Reader calibration symbol and data coded by a pulse interval coding, the method proceeds communication according to an Electronic Product Code protocol, and comprises:

picking up Ultra High Frequency signals by an antenna of a device to process Ultra High Frequency signals,
    creating an envelope signal from the Ultra High Frequency signals picked by the antenna in a demodulator,
    processing the envelope signal and decoding critical Tag to Reader calibration symbol and data in a logic unit of the device, interpreting the critical Tag to Reader calibration symbol and data, storing the interpreted data, encoding transmit data, modulating the encoded data in a modulator, and clocking the processing and the encoding by a local oscillator, wherein in the processing the envelope signal, the envelope signal from the demodulator is sampled by a sampling circuit, which is clocked to process the critical Tag to Reader calibration symbol at a first frequency clock, whereas data are processed at a second divided frequency clock lower than the first frequency clock.

2. The method according to the claim 1, wherein the first frequency clock is 2.56 MHz.

3. The method according to the claim 1, wherein the first frequency clock is 1.92 MHz.

4. The method according to the claim 1, wherein the second frequency clock is 1.28 MHz.

5. A device for processing differently measurements of critical Tag to Reader calibration symbol and data coded by a pulse interval coding, the device being configured to communicate according to an Electronic Product Code protocol and comprising:

an antenna to pick up Ultra High Frequency signals, a demodulator to create an envelope signal from the Ultra High Frequency signals picked by the antenna, a logic unit, which comprises a decoder to process the envelope signal and decode critical Tag to Reader calibration symbol and data, a logic protocol Finite State Machine unit to interpret the received critical Tag to Reader calibration symbol and data, a non-volatile memory to store the interpreted data, a coder to encode transmit data generated by the logic protocol Finite State Machine unit, a modulator to modulate the encoded data received from the coder, and an oscillator to clock the decoder and the coder, wherein the decoder is configured to receive the envelope signal from the demodulator sampled by a sampling circuit, which is clocked to process the critical Tag to Reader calibration symbol at a first frequency clock, whereas data are processed at a second divided frequency clock lower than the first frequency clock.

6. The device according to the claim 5, wherein the first frequency clock is 2.56 MHz.

7. The device according to the claim 5, wherein the first frequency clock is 1.92 MHz.

8. The device according to the claim 5, wherein the second frequency clock is 1.28 MHz.

9. The device according to the claim 5, wherein the oscillator is configured to directly clock the logic protocol Finite State Machine unit or to clock said logic protocol Finite State Machine unit across the decoder and the coder.

10. The device according to the claim 5, wherein the decoder includes a timer clocked by the first frequency clock signal from the oscillator, an asynchronous envelope re-sampling circuit receiving the envelope signal, a data 0/1 generator connected to the output of the timer and providing data for the logic protocol Finite State Machine unit, a decoder Finite State Machine, and a clock divider connected between the timer, the decoder Finite State Machine and the re-sampling circuit are configured to provide a clock signal to clock the re-sampling circuit at a first frequency clock for Tag to Reader calibration symbol or at a second frequency clock for data.

11. The device according to the claim 10, further comprising a rising edge detector circuit configured to receive the output of the re-sampling circuit and to provide a clocking signal for the logic protocol Finite State Machine unit.

12. The device according to the claim 11, further comprising a RTcal register and a Tag to Reader calibration register, which are clocked by the clocking signal to store a timer value in the RTcal register or the Tag to Reader calibration register depending on the state of the decoded Finite State Machine.

* * * * *